June 26, 1928.
F. E. VAN NESS ET AL
1,675,070
AUTOMOBILE SIGNALING MECHANISM
Filed Oct. 13, 1924      5 Sheets-Sheet 4
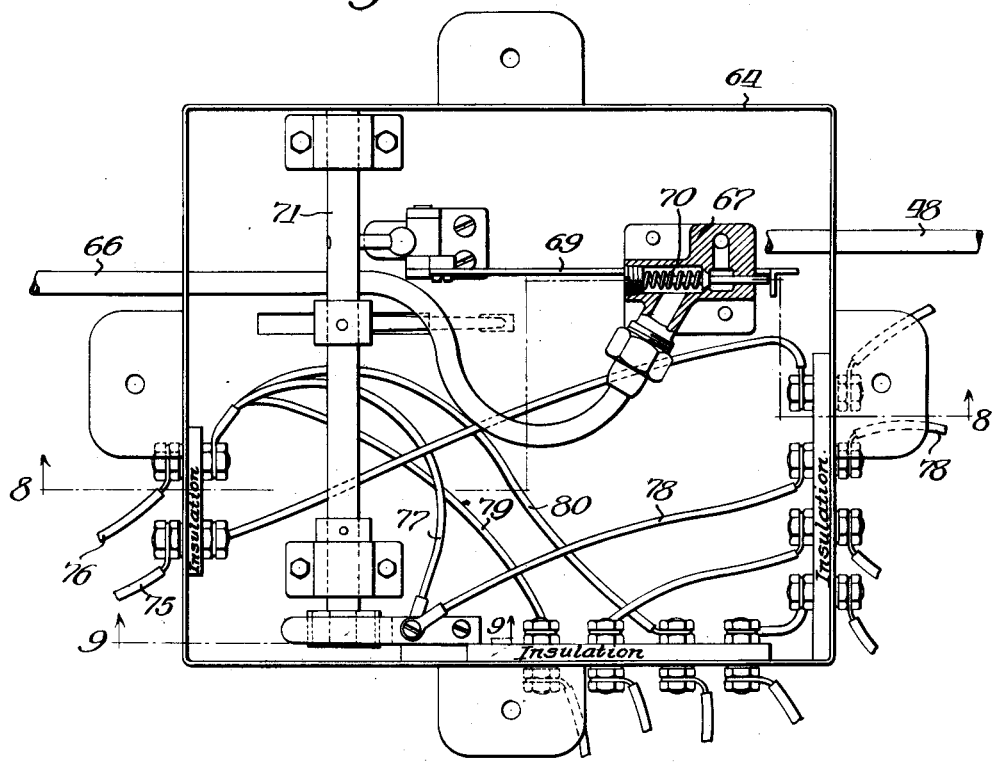
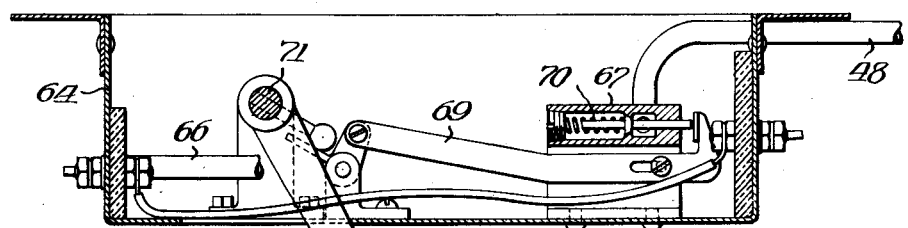
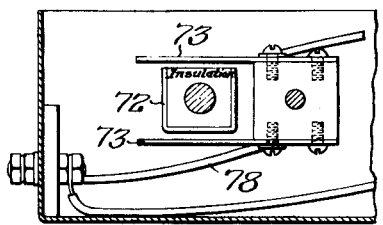
Inventors:
Frank E. Van Ness
Fredrick H. Van Ness
Witness:
By
Wilkinson, Huxley, Byron & Knight Attys.

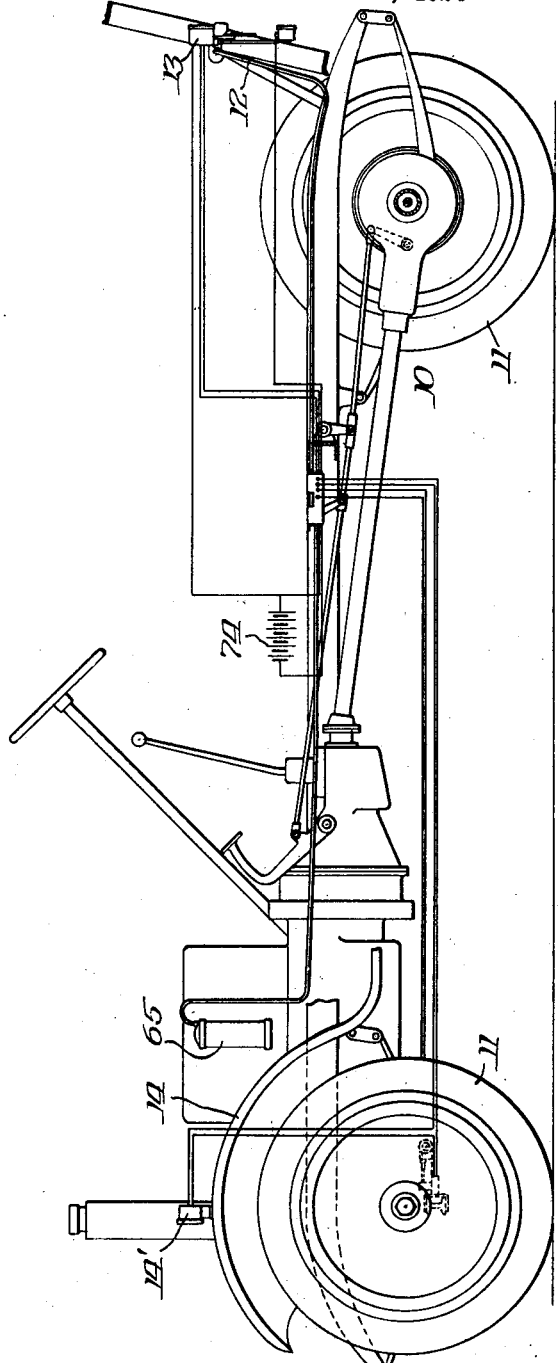

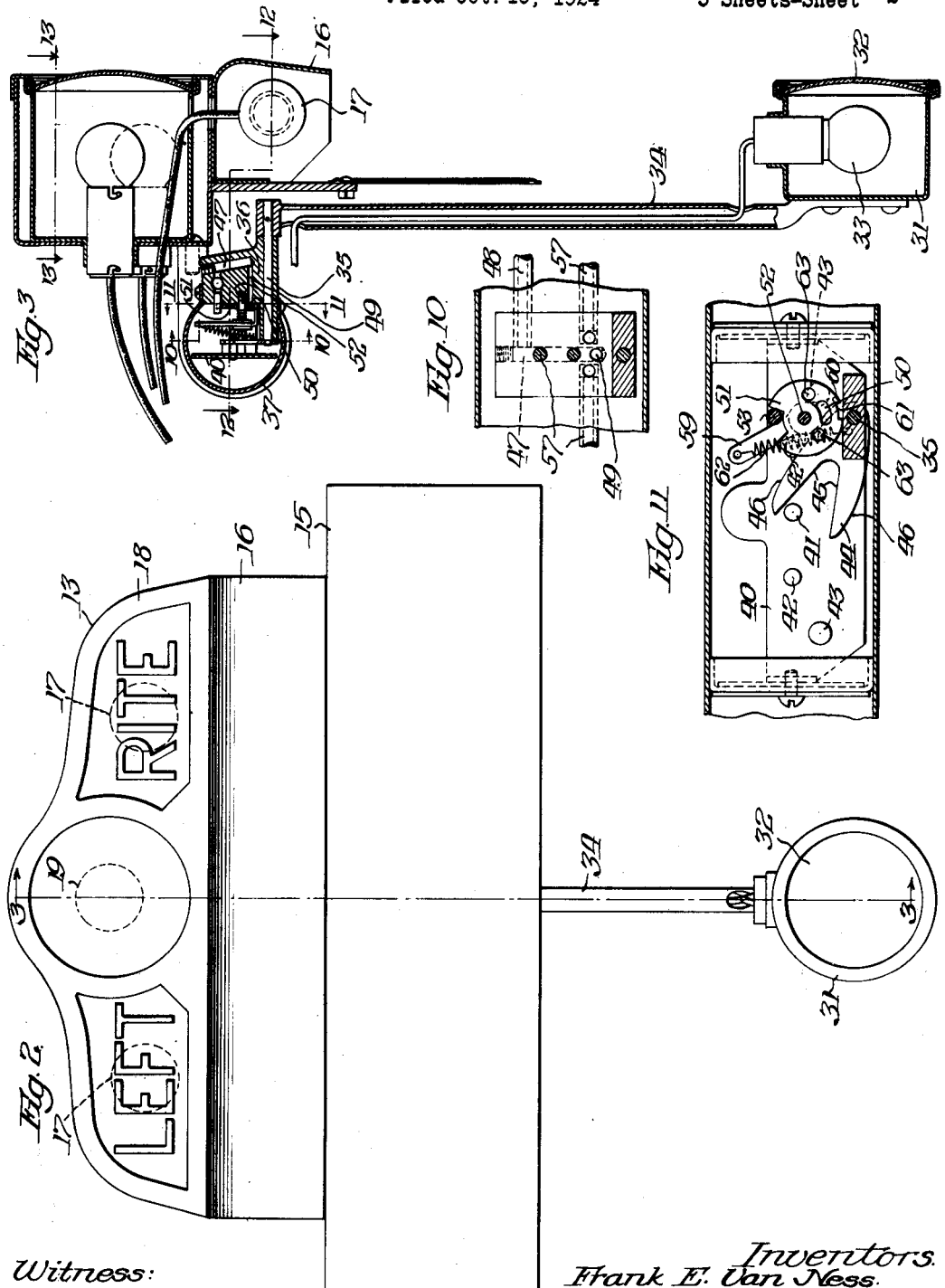

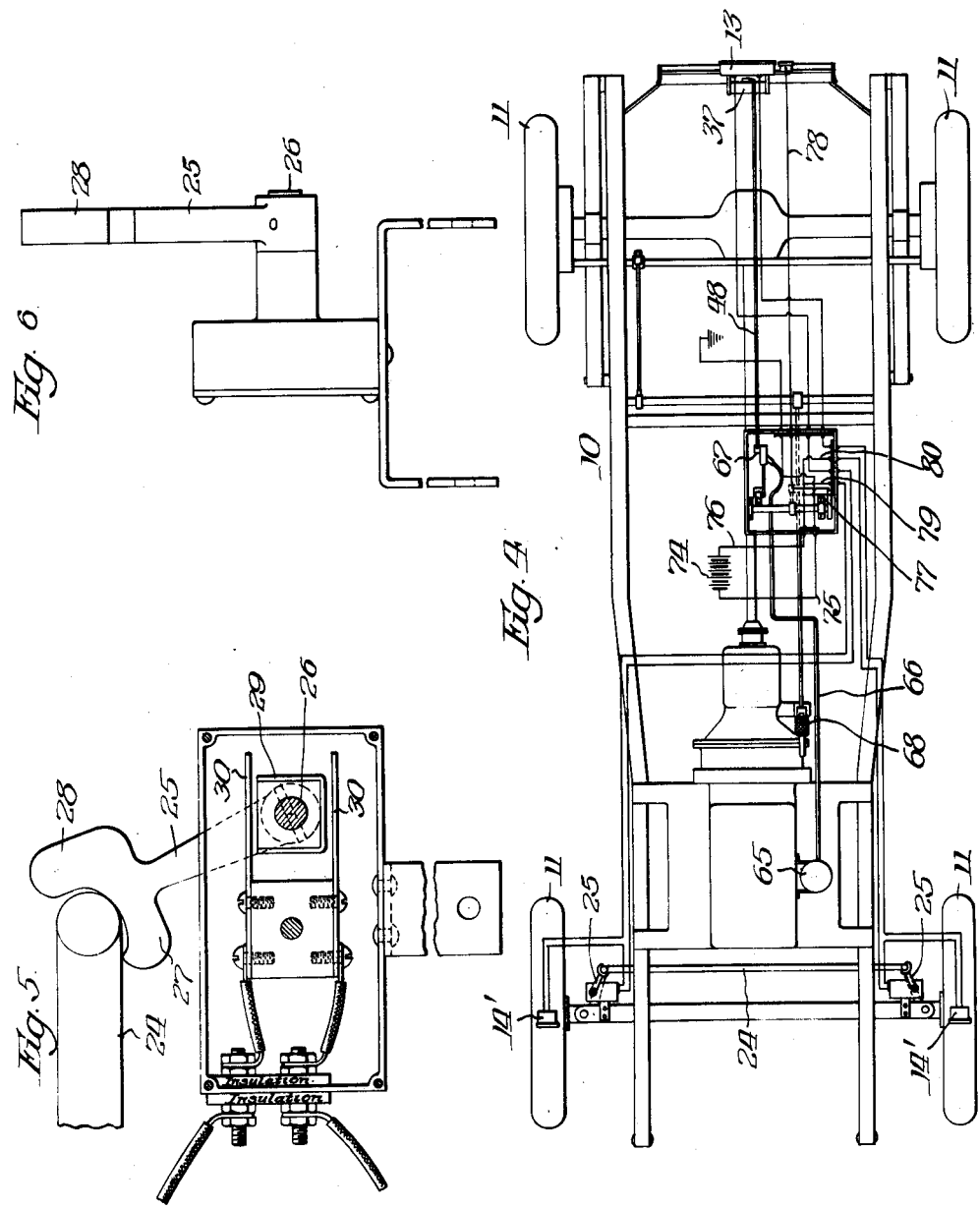

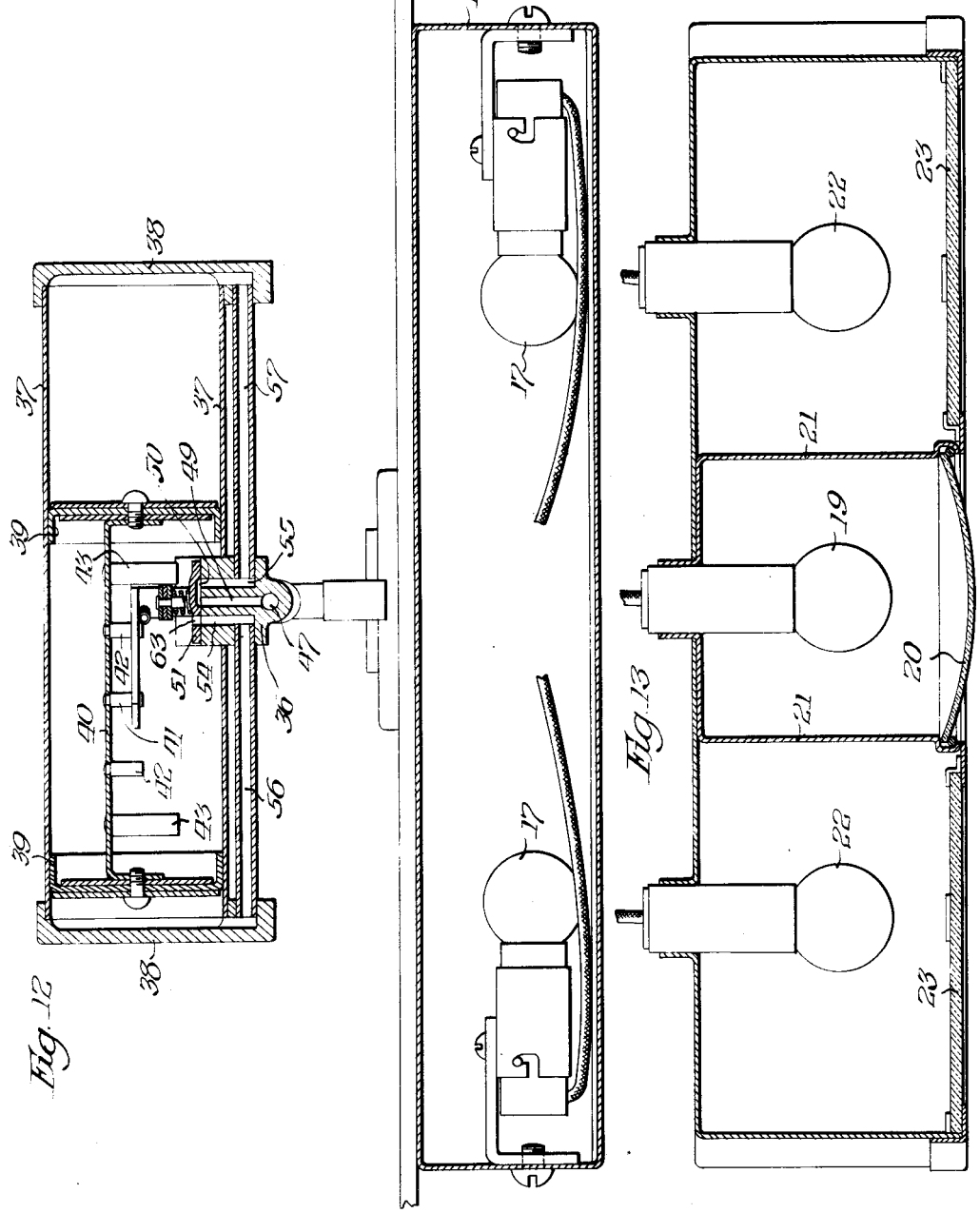

Patented June 26, 1928.

1,675,070

UNITED STATES PATENT OFFICE.

FRANK E. VAN NESS AND FREDRICK H. VAN NESS, OF CHICAGO, ILLINOIS, ASSIGNORS, BY MESNE ASSIGNMENTS, TO LOUIS D. BLOCK.

AUTOMOBILE SIGNALING MECHANISM.

Application filed October 13, 1924. Serial No. 743,183.

The present invention relates to automobile signaling mechanism.

An object of the present invention is to provide a compact and simple structure which will indicate a right turn, a left turn, or the stopping of a motor vehicle.

A further object is to provide a compact and simple mechanism which will combine with the stop light of a motor vehicle means for efficiently illuminating the rear license plate of said motor vehicle, together with means for indicating a turn to the left, a turn to the right, or the imminent stoppage of said motor vehicle.

A further object is to provide a compact structure which will indicate very noticeably an act of the driver of a motor vehicle tending to stop said vehicle.

A further object is to provide signaling mechanism for a motor vehicle which, while performing all the requisites of signaling mechanism, will be simple and readily applicable to cars as at present designed.

Further objects will appear as the description proceeds.

Referring to the drawings—

Figure 1 is a more or less diagrammatic view of the chassis of a motor vehicle having applied thereto signaling mechanism embodying the principles of the present invention;

Figure 2 is a view, on an enlarged scale, of a unitary structure showing the license plate, the reflector for illuminating same, a wig-wag stop light, a tail light, a left turn indicator and a right turn indicator;

Figure 3 is a sectional view taken along the plane indicated by the arrows 3—3 of Figure 2;

Figure 4 is a diagrammatic view illustrating in plan view the chassis of a motor vehicle embodying the present invention, which view illustrates the cooperation between the steering mechanism of the vehicle and the right and left turn indicators;

Figure 5 is a view in section and Figure 6 is a view in elevation of switch operating mechanism responsive to the steering mechanisms of the vehicle;

Figure 7 is a view, on an enlarged scale, of part of the structure shown in Figure 4 and illustrating mechanism for controlling the stop light of the vehicle;

Figure 8 is a sectional view taken along the plane indicated by the arrows 8—8 of Figure 7;

Figure 9 is a sectional view taken in the direction of the arrows 9—9 of Figure 7;

Figure 10 is a sectional view taken along the plane inidcated by the arrows 10—10 of Figure 3;

Figure 11 is a view taken along the plane indicated by the arrows 11—11 of Figure 3;

Figure 12 is a sectional view taken along the planes indicated by the arrows 12—12 in Figure 3; and Figure 13 is a sectional view looking in the direction of the arrows 13—13 of Figure 3.

According to the present invention means are provided whereby when the operator of the motor vehicle applies the brake (or, if preferred, the clutch or any other mechanism used in the stoppage of the vehicle), he will set into action certain instrumentalities which will cause a wig-wag motion for the stop signal, as well as causing the lighting of same. For this purpose a connection is made, when the operator performs an act to stop the motor vehicle, which will make a connection with the vacuum system of the car to produce a reciprocating movement, which is transmitted to the stop light to produce the wig-wag motion referred to. The present invention contemplates not only the production of a wig-wag motion of the stop light when stoppage is being effected, but also contemplates in the structure embodying the stop light certain indicators which indicate a right and left turn. Said indicators according to the present disclosure are connected with and are controlled by the steering mechanism of the car. The same structure which carries the right and left turn indicators also carries the tail light of the car, the license plate, and means for fully illuminating said license plate. According to common practice at the present time, the tail light of a motor car is provided with a window which is called upon to illuminate the license plate. The illumination from the tail light is ordinarily very poor and in many sections of the United States steps are being taken to enforce regulations requiring the full illumination of the license plate after dark.

Figures 1 and 4 represent the chassis of a motor vehicle, which chassis is indicated as a whole by the numeral 10. Said chassis is provided with the wheels 11—11 and has an upstanding portion 12 at the rear, suitable for supporting a casing 13, referred to hereinafter. Said chassis is also provided with the front fenders 14, which serve as supports for certain signaling mechanism.

The details of the casing 13 and associated parts are best shown in Figures 2, 12 and 13. Said casing 13 provides a mounting means for a license plate 15. Located above the license plate 15 is the reflector 16, which provides a housing containing the two electric lights 17—17. Mounted above the reflector housing 16 is the light housing 18, which is divided into three compartments, as best shown in Figure 13. The center compartment contains an electric light 19 and is provided with the transparent window 20, which may be red in color to indicate danger. Said light 19 is the tail light of the motor vehicle. Flanking the compartment containing the tail light are two compartments separated from the tail light compartment by the walls 21—21. Said two compartments are provided with lights 22—22. The compartments containing the lights 22—22 are provided with the transparent closures 23—23, one of which may be provided with the lettering "Left", indicating a left turn of the vehicle, and the other of which may be provided with the lettering "Rite," indicating a right-hand turn. The tail light 19 and the license plate illuminating lights 17—17 will preferably be connected together in series, whereby the license plate will be illuminated when the tail light is lighted.

The mechanism for controlling the signal lights indicating the right and left turn will now be described. Referring to Figure 4, the numeral 24 indicates a rod extending transversely of the motor vehicle, which rod is moved toward one side or the other of the motor vehicle when a turn is being made. Said rod controls the fingers 25—25 located at the two ends thereof, which fingers operate switch mechanism for the lights 22—22 (Figure 13). The two fingers 25—25 are composites of one another and the illustration of one will suffice for a description of both. Referring to Figure 5, it will be noted that the finger 25 is pivoted for movement about the axis 26. At its outer end the finger 25 has an L-shaped conformation, being provided with the base portion 27 and the outwardly extending portion 28. Viewing the mechanism as shown in Figure 5, each end of the rod 24 will ride on the corresponding finger 25 in the space provided by the portions 27 and 28 of said finger 25. Still referring to Figure 5, when the rod 24 is moved toward the right the finger 25 will be moved in a clockwise direction. Fixedly carried by the finger 25 is the switch contactor 29 adapted to contact with the relatively stationary blades 30—30, which are connected to electrical conductors, to be referred to hereinafter. Movement of the switch finger 25 in a clockwise direction due to movement toward the right (Figure 5) will result in the turning of the contactor 29 to bridge the two relatively stationary switch contacts 30—30, thereby closing the switch. Said contactors 30—30 will be connected in circuit to one of the lights 22, and when said contactors 30—30 are bridged by the contactor 29 the corresponding signal light 22 will be illuminated to indicate a right or left turn, as the case may be. As the rod 24 is moved back to its mid position, or neutral position, the finger 25 will be moved in a counterclockwise direction, whereby the contactor 29 will move out of engagement with the contact members 30—30 thereby extinguishing the corresponding signal light 22. Inasmuch as the two fingers 25—25 are composites of one another, it will be clear that movement of the rod 24 in one direction will illuminate one of the lights 22 and movement in the opposite direction will illuminate the other of the lights 22. When the rod 24 is in its mid position, or neutral position, both of the fingers 25—25 will be in their mid positions and neither of the lights 22—22 will be lighted.

The numeral 31 (Figure 3) indicates a stop light casing having the transparent window 32 and being provided with the electric light 33. Said casing 31 is carried by the tubing 34, which provides a conduit for an electrical conductor leading to the electric light 33. Said tubing 34 and casing 31 are carried by the shaft 35, which is adapted to have an oscillating movement in the casting 36, whereby a wig-wag motion may be communicated to the housing 31 in a plane lying transversely of the motor vehicle.

The shaft 35 is oscillated by means of mechanism which will now be briefly described. The casting 36 has fastened thereto the cylinder 37 having the end heads 38—38 (Figure 12). Mounted within the cylinder 37 are the two pistons 39—39 connected together by means of the plate 40. Projecting from said plate 40 is the pin 41 located symmetrically of the length of said plate between said pistons. Mounted equidistant from said pin 41 are the two pins 42—42 and located at a greater distance from the pin 41 and equidistant therefrom are the elongated pins 43—43. All of said pins 41, 42 and 43 project from the same side of the plate 40. The plate 40 with its projecting pins is adapted to move the yoke 44, best illustrated in Figure 11, which yoke is fixedly united to the oscillatable shaft 35 carrying the stop light housing 31. Said yoke 44 is provided with the V-shaped walls 45 and with the outer walls 46—46. Movement of the plate 40 communicate oscillating movement to the yoke 44 and shaft 35 in a manner which will be referred to hereinafter.

The casting 36 is provided with a passageway 47 (Figures 3, 10 and 12), which is adapted to have communication with the vacuum system of the motor vehicle. The mechanism for controlling communication between the cylinder 37 and the vacuum system of the motor vehicle will be described hereinafter, it being sufficient to state at this point that such communication is had through the tube 48, shown in Figures 4 and 7, which tube is connected to the casting 36 in communication with the passageway 47 thereof. Said passageway 47 communicates with the passageway 49 (Figure 12), which passageway 49 has communication with the recess 50 in the oscillatable valve 51 (Figures 3 and 12). Said valve 51 is mounted for oscillation about the pin 52 (Figure 12), which may be screw-threaded into the casting 36. As best shown in Figure 11, the oscillating movement of said valve 51 is limited by means of the fixed pin 53, which is adapted to abut against the two ends of an arcuate notch in said valve 51. The recess 50 in the valve 51 is adapted to communicate selectively with the two passageways 54 and 55 (Figure 12), of which one passageway 54 has communication with one of the cylinder heads 38 through the tube 56, and of which the other passageway, 55, has communication through the tube 57 with the other of the cylinder heads. The cylinder 37 is provided with openings whereby air at atmospheric pressure may enter between the two pistons 39—39. The valve 51 is pressed against its seat by a spring or other preferred means. Mounted upon the pin 52 is the oscillatable operating member 59 (Figure 11) having a turned over end portion 60 adapted to abut against one or the other end of a slot 61 in the periphery of the valve 51. The outer extremity of the operating member 59 is connected with the yoke 44 by means of the tension spring 62. Said operating member 59 is located in a plane to be operated by one or the other of the pins 43—43 in the reciprocating movement of the plate 40. The valve 51 is provided with the two holes 63—63. In one position of the valve 51, one of said holes 63—63 is adapted to communicate with the passageway 54 (Figure 12). In the other extreme position of the valve 51, the other of said holes 63 is adapted to communicate with the passageway 55. As indicated in Figure 12, when one of the holes 63 is in communication with one of the passageways 54—55, the other of said passageways 54—55 is in communication, through the recess 50, with the passageway 49, which communicates through the passageway 47 to the tube 48, which, as referred to hereinabove, is adapted to have communication with the vacuum system of the motor vehicle.

Referring now to Figure 7, the numeral 64 indicates a casing which provides a housing for certain control mechanism for the tube 48. Referring to Figures 4 and 7, the numeral 65 indicates the vacuum tank of the motor vehicle, which tank is connected by means of the tube 66 to the control valve 67. The other side of said control valve 67 is connected to the cylinder 37 by means of the tube 48. The numeral 68 indicates a pedal or other mechanism which is operated in the stoppage of the vehicle. Said pedal is connected, through mechanism which need not be described, to the reciprocating rod 69 (Figure 7), which rod controls the operation of the valve 67. Said valve 67 is provided with the spring-pressed plunger 70, which controls communication between the tube 66 and the tube 48. It will be sufficient to state that when the pedal or other device 68 is applied to bring the motor vehicle to a stop, communication will be opened between the tubes 66 and 48. Inasmuch as the tube 66 is connected to the vacuum system of the motor vehicle, a suction will be communicated to the pipe 48, which suction will be intermittent in its nature, as is will understood. Intermittent suction in the pipe 48 will result in the reciprocation of the pistons 39—39, which reciprocation will be communicated to the shaft 35 (Figure 3) to produce a wig-wag motion of the stop light housing 31.

Not only does the pedal 68 or other device for stopping the car control the wig-wag motion of the stop light housing 31, but said device controls an electrical switch for illuminating the light 33 in said housing. Connected to the device 68 is the rocking shaft 71 carrying the contactor 72 adapted to bridge the two relatively stationary contact members 73—73 (Figure 9). Said contact members are connected through the light 33 and certain other circuits, which will be referred to briefly hereinafter, to a source of electrical energy, whereby operation of the pedal or other device 68 will result not only in the wig-wag motion of the stop light housing 31, but will also result in the lighting of the light 33 in said housing during said wig-wag movement.

A source of electrical energy is indicated in Figure 4 by the numeral 74. One side of said source may be grounded, through the conductor 75, preferably though not necessarily to the signal housing 13. The other side of said source of electrical energy 74 is connected through the conductor 76 to a plurality of branch circuits. One of said branches is indicated by the numeral 77 and may lead to one of the switch contact members 73 (Figure 9). The other of said switch contact members 73 may be connected, through the conductor 78, to the electric light 33 in the housing 31. The other side of said electric light 33 may be connected to the housing 13. It will be clear, therefore, that when the switch contactor 72 is moved to bridging position between the contact members 73—73, the electric light 33 in the casing 31 will be lighted.

Two other branch circuits from the conductor 76 are indicated by the numerals 79 and 80. The conductor 79 is connected to the fender light 14' on the right side of the vehicle, thence to the corresponding switch controlled by the finger 25, thence to the indicator light 22 at the rear of the vehicle, from which point circuit may be traced through the ground back to the conductor 75 to the other side of the source of electrical energy. The branch conductor 80 is connected to the left-hand switch operated by the finger 25, thence through the left-hand fender light 14', through the left-hand indicator light 22, from which point circuit may be traced through the ground connection to the conductor 75, back to the source of electrical energy. It will be clear that if either of the switches controlled by the fingers 25—25 is closed by the turning of the steering mechanism, an indication will be given by the corresponding fender light 14' and the corresponding rear indicator light 22.

Operation of the mechanism to stop the motor car will result not only in the lighting of the stop light 33 but will result in the opening of the valve 67, whereby communication is had from the vacuum tank 65, through the tube 66 and tube 48, to the cylinder 37. By reason of the connection of the cylinder 37 with the vacuum tank 65, intermittent suction will be applied to said cylinder 37. With the parts in the positions shown in Figure 12, communication will be had from the vacuum tank through the passageway 47, passageway 49, passageway 55 and tube 57 to the right-hand side of the right-hand piston 39. Pressure on the two sides of the left-hand piston 39 will be equalized, inasmuch as the left-hand side of said left-hand piston 39 has communication with the right-hand side of said left-hand piston 39 through the tube 56, passageway 54 and valve opening 63. Suction on the right-hand side of the right-hand piston 39 will result in the movement of the piston toward the right. As referred to above and as indicated in Figure 11, the yoke 44 straddles the pin 41, which pin is carried by the plate 40 connected to the pistons 39—39. The outer edges 46—46 of the yoke 44 are adapted to be engaged by the pins 42—42. The result of movement of the pistons 39—39 toward the right will be a movement of the yoke 44 about its axis of rotation. Said yoke is rigidly connected to the shaft 35 which carries the wig-wag stop light housing 31. Such movement of the yoke 44 will put the spring 62 under tension. In the course of the movement of the plate 40 toward the right, the left-hand finger 43 will engage the operating member 59 and will move same past dead center, whereby the valve 51 will be suddenly oscillated, the limit of said oscillation being fixed by means of the pin 53. By reason of the lost motion connection between the operating member 59 and the valve 51, the operation of the valve 51 may be accomplished with a snap action. Referring to Figure 12, it may be stated that at this time the recess 50 on the under side of the valve 51 will now connect passageway 54 and passageway 49. At this time passageway 55 will be connected to the region between the pistons 39—39, this communication being had by reason of the fact that an aperture 63 (Figure 11) is brought into communication with passageway 55. At this time, that is—when the plate 40 and pistons 39—39 are at their extreme right-hand end of their travel as the parts are viewed in Figure 12, suction from the vacuum tank will be communicated through the passageway 47, passageway 49, recess 50, passageway 54 and tube 56 to the left-hand side of the left-hand piston 39. Pressure will be equalized on the two sides of the right-hand piston 39, whereby movement of pistons 39—39 and connecting plate 40 toward the left will be had. This movement will result in the actuation of yoke 44 and valve 51 to the position illustrated in Figure 12. The cycle of operation above described will continue as long as the motor of the motor vehicle is operating and the valve 67 is open to allow communication between the tube 66 and tube 48; that is to say—the movement of oscillation, or wigwag motion, of the stop light casing 31 will continue so long as the operator is actuating the mechanism to produce the stoppage of the motor vehicle and so long as the suction is being produced in the vacuum tank 65. When the engine of the motor vehicle is stopped, whereby the suction in the vacuum tank is terminated, the wig-wag motion will, of course, cease. For this reason the inadvertent wastage of energy in producing the wig-wag motion is rendered practically impossible.

The tail light 19 and the lights 17—17 for illuminating the license plate 15 may be connected in series, whereby when the tail light 19 is energized the two lights 17—17 will be burning for the purpose of fully illuminating the license plate 15. It will be noted that the tail light, the right and left turn lights, the license plate and the housing for illuminating said license plate are all located in a substantially unitary structure and that the mechanism for communicating wig-wag motion to the stop light is located immediately in rear of said unitary structure, with said stop light mounted in position below and symmetrically disposed relative to said unitary structure.

Though a preferred embodiment of the present invention has been described in detail, it will be clear that many modifications will occur to those skilled in the art. It is intended to cover all such modifications that fall within the scope of the appended claims.

What is claimed is:

1. In an automobile, in combination, means for stopping the motion of said automobile, a stop signal, motive means responsive to the operation of said stopping means for communicating wig-wag motion to said stop signal, said motive means comprising a cylinder having piston means therein and a valve for connecting portions of said cylinder selectably to the vacuum system of said automobile, other portions of said cylinder having communication with the atmosphere and means responsive to the movement of said piston for controlling said valve to alternatively apply a moving force to the two sides of said piston means.

2. In an automobile, in combination, means for stopping the motion of said automobile, a stop signal, motive means for applying a wig-wag motion to said stop signal, and means connecting said motive means to the vacuum system of said automobile to cause operation of said motive means by the difference of pressure between the atmosphere and the pressure in said vacuum system.

Signed at Chicago, Illinois, this 6th day of October, 1924.

FRANK E. VAN NESS.
FREDRICK H. VAN NESS.